(12) United States Patent
Hyon

(10) Patent No.: US 6,435,438 B1
(45) Date of Patent: Aug. 20, 2002

(54) CENTRIFUGAL BRAKE STRUCTURE OF DUAL BEARING TYPE FISHING REEL

(75) Inventor: KwangHo Hyon, KyongKi-Do (KR)

(73) Assignee: Toyo Engineering Co., Ltd., Kyongki-Do (KR)

( * ) Notice: Subject to any disclaimer, the term of this patent is extended or adjusted under 35 U.S.C. 154(b) by 0 days.

(21) Appl. No.: 09/651,177

(22) Filed: Aug. 30, 2000

(30) Foreign Application Priority Data

Sep. 2, 1999 (KR) .............................................. 99-37980

(51) Int. Cl.[7] .............................................. A01K 89/02
(52) U.S. Cl. .................................... 242/289; 188/181 A
(58) Field of Search ...................... 242/289; 188/181 A, 188/185

(56) References Cited

U.S. PATENT DOCUMENTS

| 1,566,594 | A | * | 12/1925 | Graham | 242/289 |
|---|---|---|---|---|---|
| 2,290,662 | A | * | 7/1942 | Willison | 242/289 |
| 4,601,438 | A | * | 7/1986 | Young | 242/289 |
| 5,393,005 | A | * | 2/1995 | Nakajima | 242/289 |
| 5,782,420 | A | * | 7/1998 | Forslund et al. | 242/289 |
| 5,803,385 | A | * | 9/1998 | Baisch | 242/289 |
| 5,865,387 | A | * | 2/1999 | Hirano | 242/289 |
| 6,196,485 | B1 | * | 3/2001 | Sato | 242/289 |

* cited by examiner

Primary Examiner—Emmanuel M. Marcelo
(74) Attorney, Agent, or Firm—Notaro & Michalos P.C.

(57) ABSTRACT

A centrifugal brake structure of dual bearing type fishing reel has a brake body assembled onto a spool shaft with a plurality of pins onto which corresponding brakes are placed. The brake body includes circumferential recesses, each recess having step portions. A fixing plate for fixing and releasing a brake operation connected to the brake body and having fixing protrusions. A brake stopper and a spring are inserted into the each of the recesses, enabling the brake to be pushed out from a pin only when a fishing line is cast a long distance from the reel and the brake does not interfer when the reel is idly rotated or the line is cast only short distances.

2 Claims, 8 Drawing Sheets

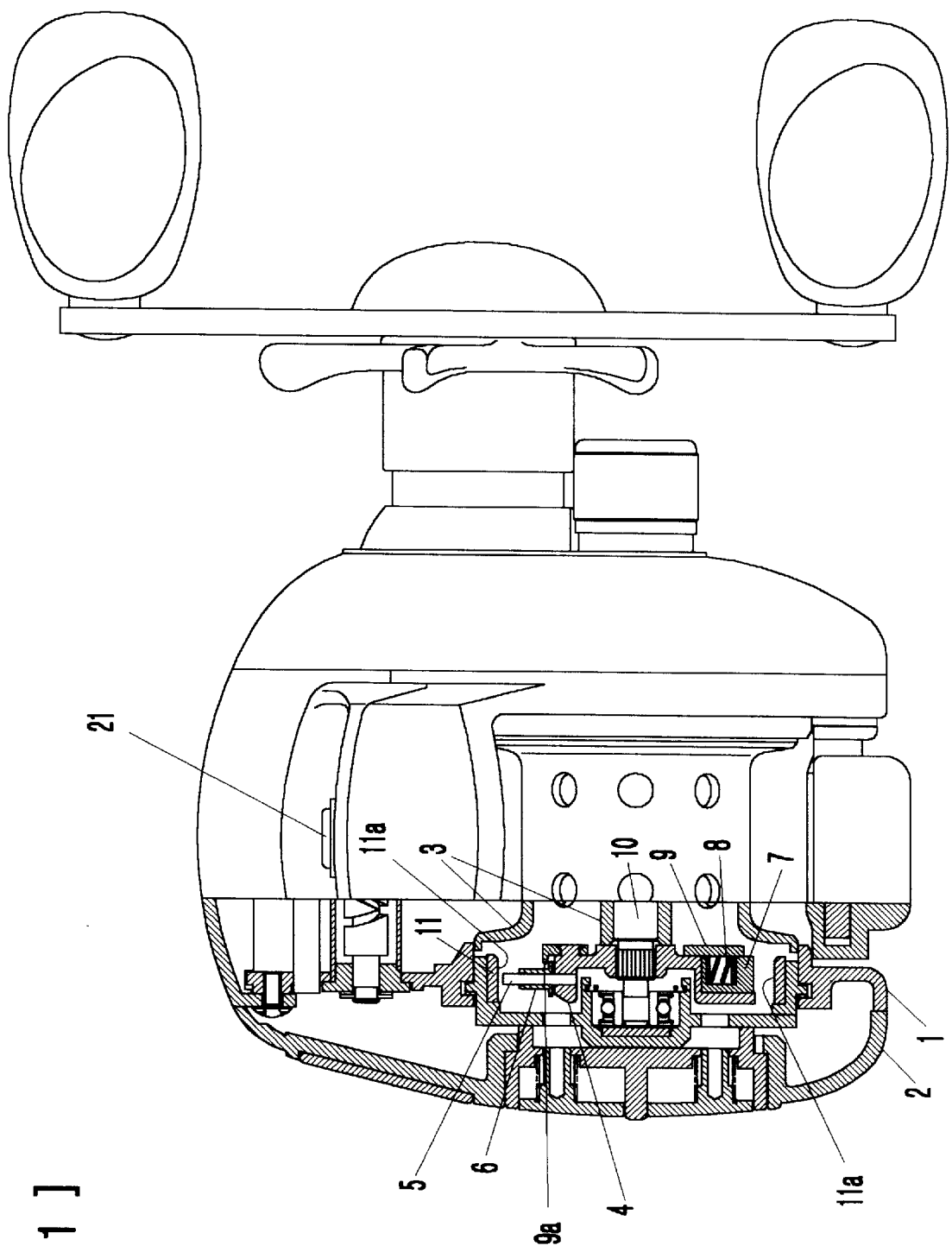
[ Fig 1 ]

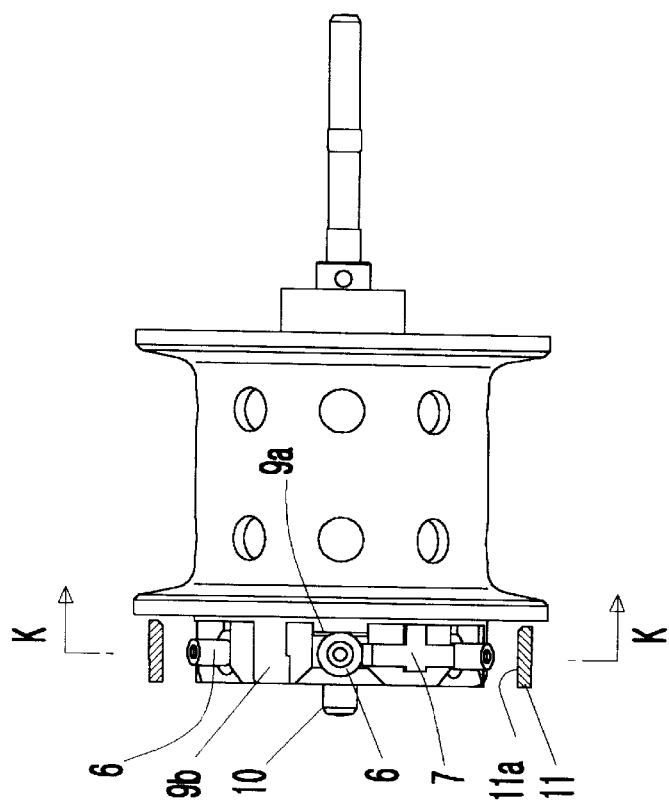
[ Fig 3 ]
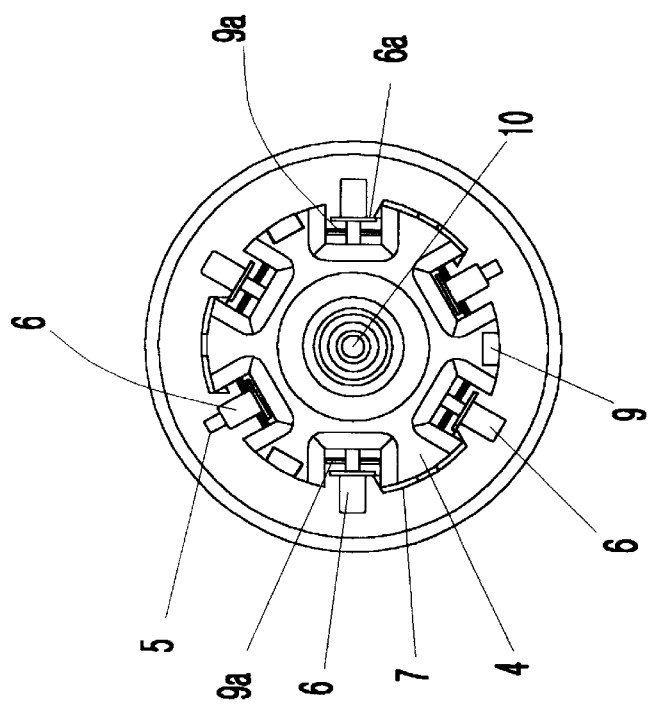
[ Fig 2 ]

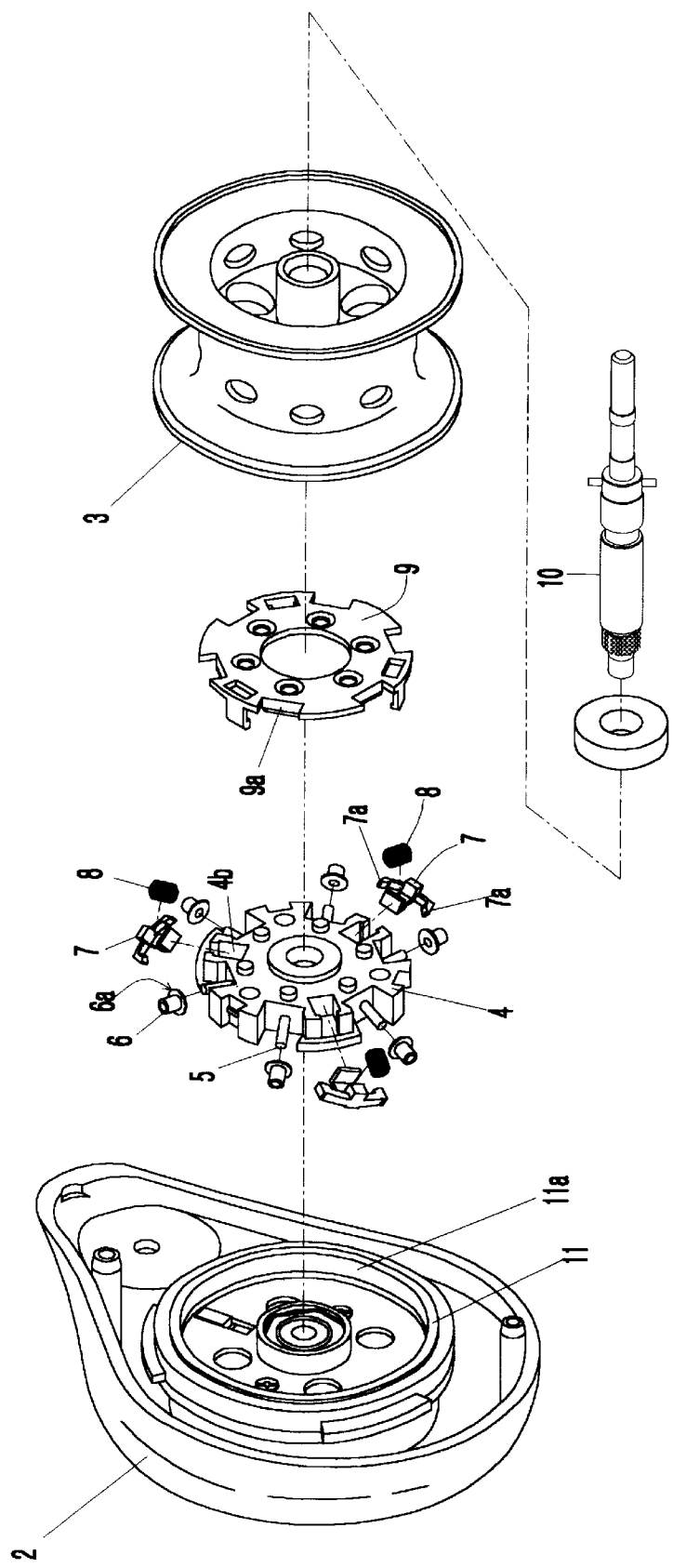

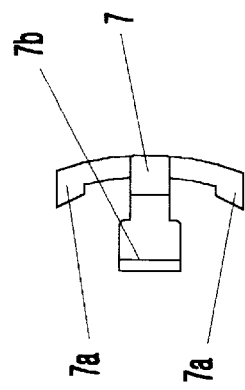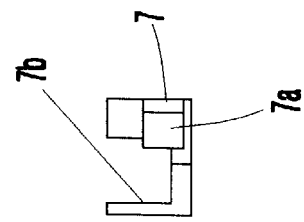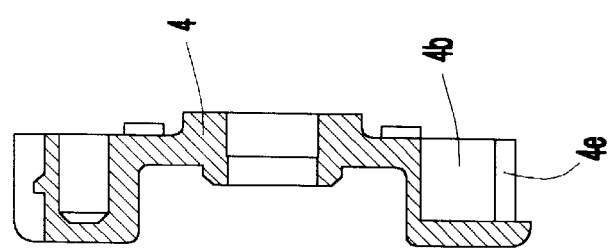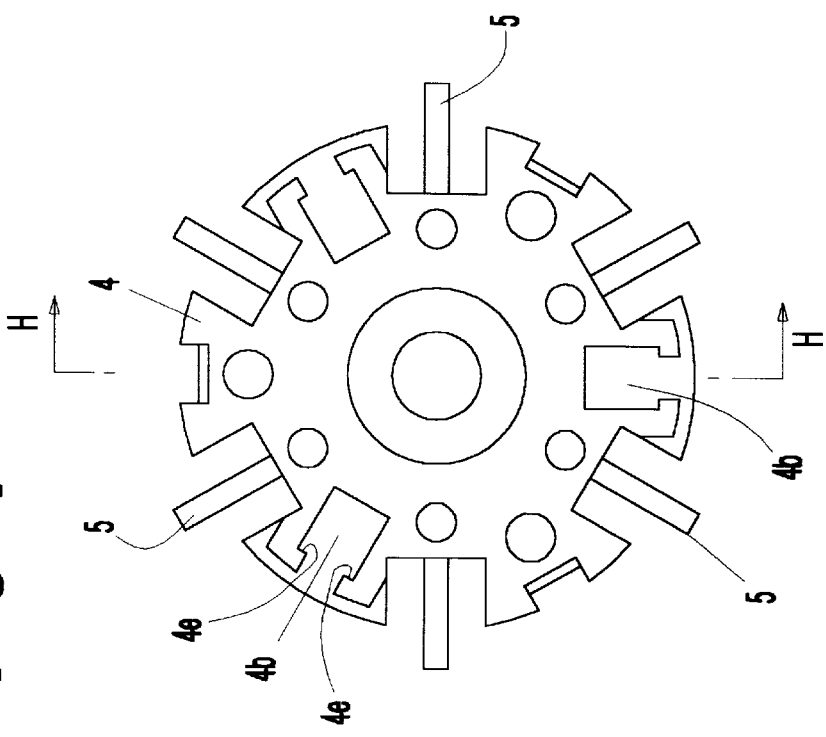

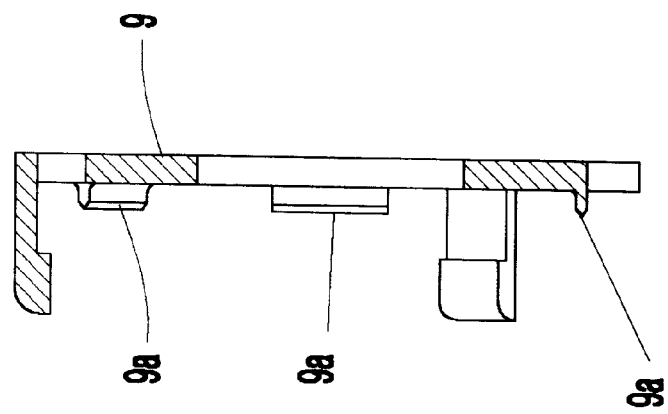
[ Fig 9 ]
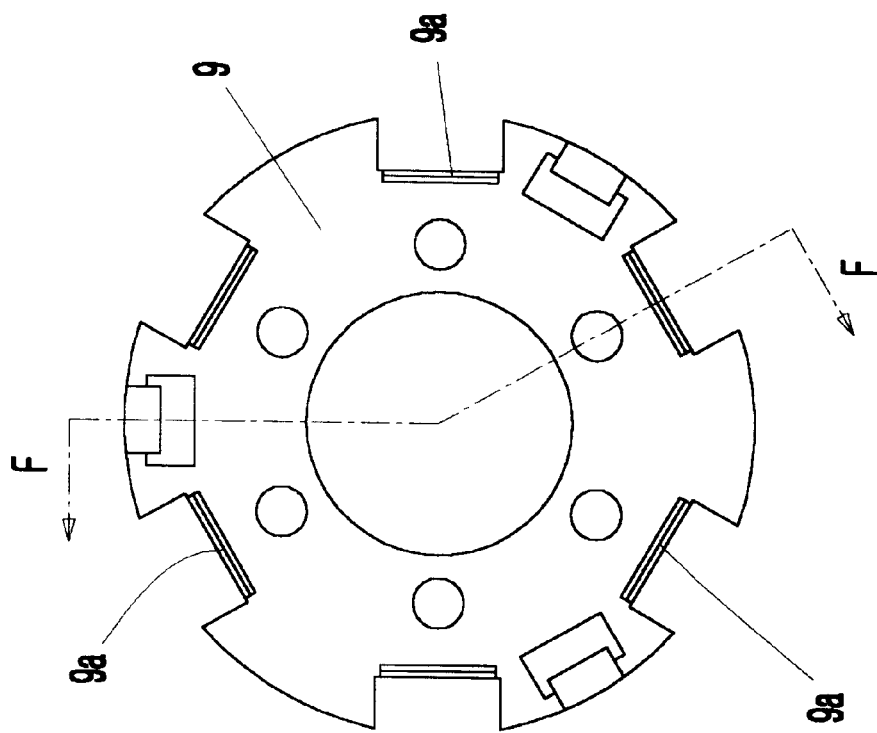
[ Fig 8 ]

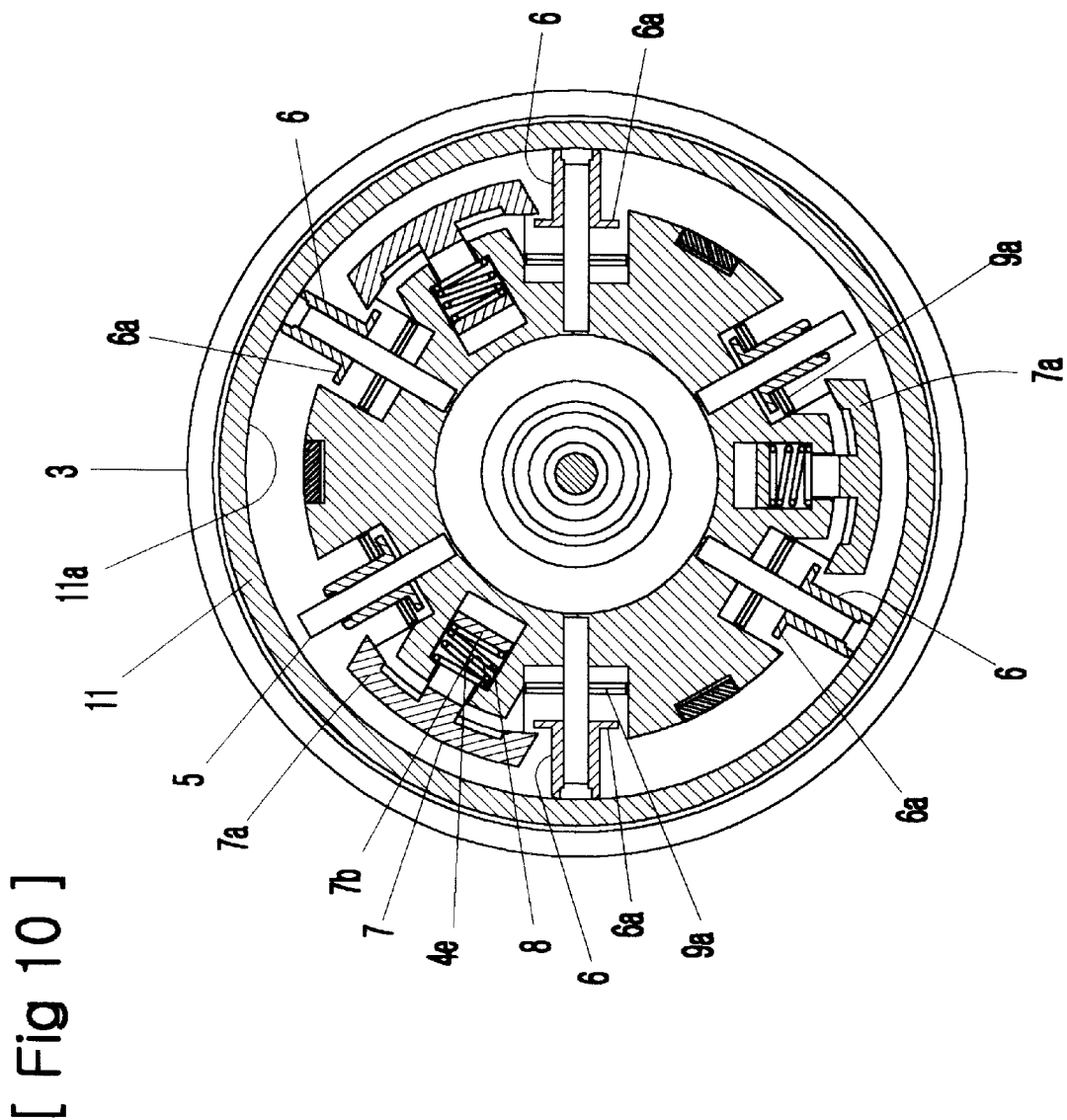
[ Fig 10 ]

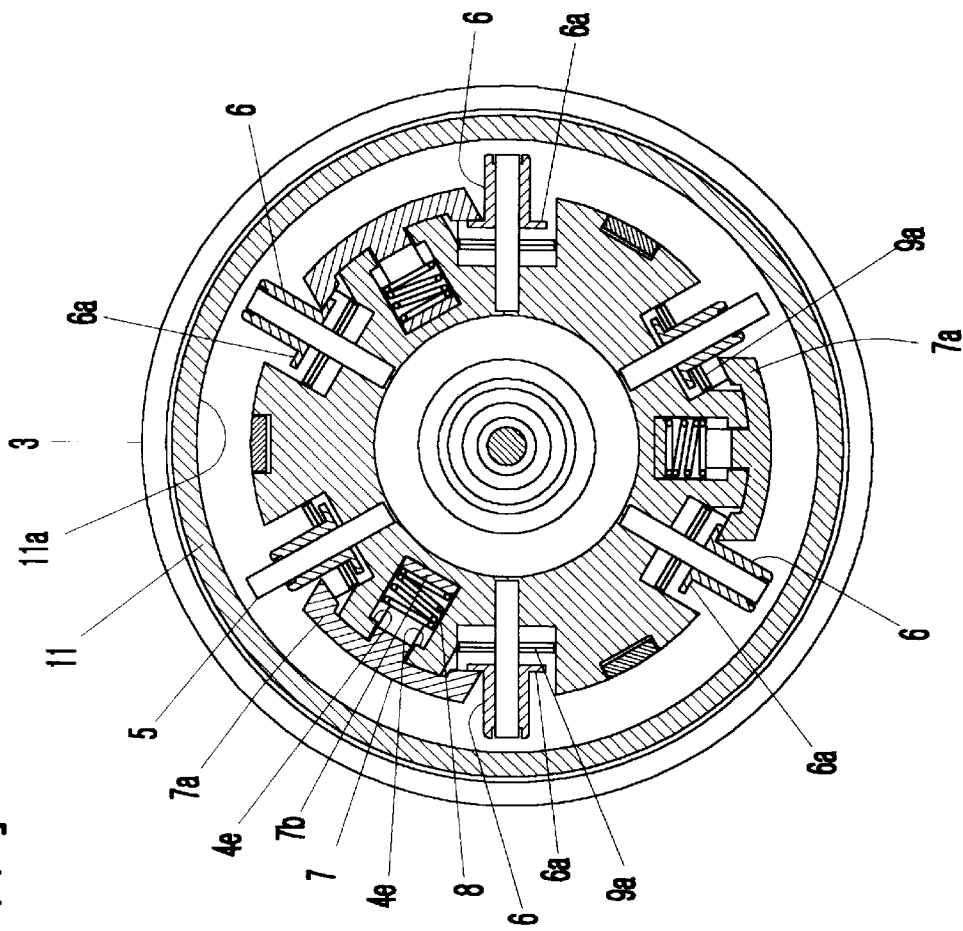
[ Fig 11 ]

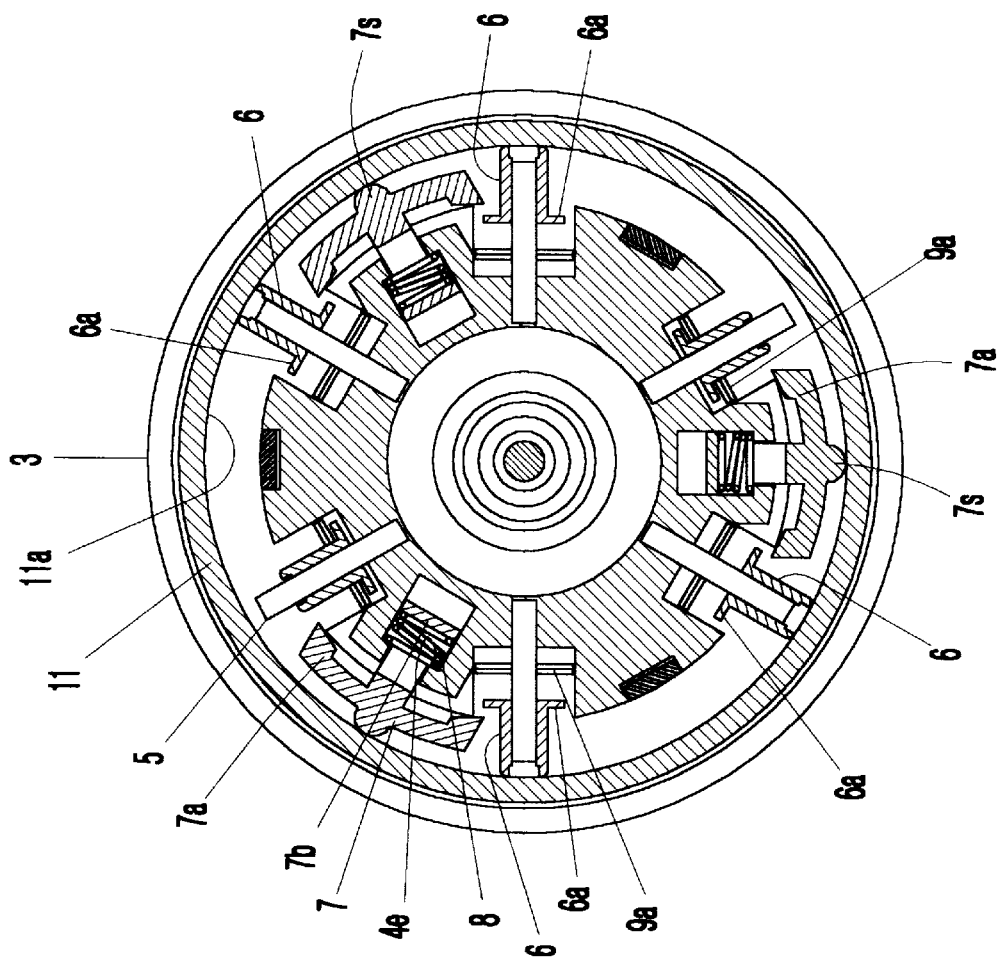
[Fig 12]

CENTRIFUGAL BRAKE STRUCTURE OF DUAL BEARING TYPE FISHING REEL

BACKGROUND OF THE INVENTION

1. Field of the Invention

The present invention relates to a fishing reel, more particularly to a centrifugal brake structure of dual bearing type fishing reel, which is able to control a rotation speed of a spool upon casting.

2. Description of the Prior Art

In general, upon casting a fishing line with a sinker suspended thereto, since the casting speed of the fishing line with the sinker is inconsistent with that of a fishing line unwound from the spool, a tangling of the fishing line with the spool is occurred. To resolve the problem of tangling, a centrifugal brake has been used.

The centrifugal brake in prior art controls a rotation speed of a spool in such a way that when the spool is rotated at high speed by a long distance casting, a brake may be pushed out toward an inside 11a of a brake ring 11, so that the brake being in contact with the brake ring. The brake of centrifugal brake is operated upon any casting thus to increase a friction between brake and brake ring, which causes reduction of durability of the brake and occurance of frictional noise. To avoid this problem, preferably, the brake should be not operated at any of the cases that a handle is turned by hand, the spool is idlingly rotated, upon a short distance casting (that is pitching), or upon a flip casting as well as upon a long distance casting.

Moreover, since the brake of prior art is still operated when the casting fishing line with sinker drops in speed, a problem of reduction of casting distance or a tangling of fishing line is raised. To resolve the tangling, it is necessary to separate a side cover 2 from a reel body 1, thus to take a brake assembly, to which a centrifugal brake is assembled, from the reel body, thus to regulate a tangled fishing line, and to reassemble the spool assembly into the spool body. However, in the course of the process, the brakes being in contact with brake ring.

Moreover, since all of the brakes of the centrifugal brake in prior art are operated together, it is not controllable of braking force so that a precise braking operation cannot be carried out.

SUMMARY OF THE INVENTION

It is an object of the present invention to resolve the problems involved in the prior art, and to provide a centrifugal brake structure of dual bearing type fishing reel capable of controlling a rotation speed of the reel.

Another object of the present invention is to provide a centrifugal brake structure of dual bearing type fishing reel which is operated only when a long distance casting.

Another object of the present invention is to provide a centrifugal brake structure of dual bearing type fishing reel which is not operated by dragging force of a brake stopper when a fishing line with a sinker is drops with low speed after the fishing line being cast with high speed, so as to increase casting distance of the fishing line with a sinker.

To accomplish the above objects, in accordance with one aspect of the present invention, there is provided a centrifugal brake structure of dual bearing type fishing reel, comprising:

a brake body assembled onto a spool shaft and having a plurality of pins into which respective brake is inserted, and circumferential recesses, each recess having step portions; and a fixing plate for fixing or releasing an operation of brake, assembled to the brake body and having fixing protrusions; the brake body further comprising, a plurality of brakes which are inserted into the pins for braking a rotation of the spool shaft, and a brake stopper inserted into the recess of brake body, enabling the brake to be pushed out of the pin only upon a long distance casting and having a stopping protrusion, a spring being assembled between the stopping protrusion and the step portion, the brake structure being not operated when the spool is idlingly rotated or upon a short distance casting, but operated upon a long distance casting.

In a preferred embodiment, the brake stopper comprises a protruding step 7s which is formed onto the middle portion of the brake stopper 7, the protruding step being in contact with the inside of the brake ring to obtain a larger friction force therebetween.

BRIEF DESCRIPTION OF THE DRAWINGS

The above object, other features and advantages of the present invention will become more apparent by describing the preferred embodiment thereof with reference to the accompanying drawings, in which:

FIG. 1 is a cross-sectional view illustrating a centrifugal brake structure for dual bearing type fishing reel in accordance with a preferred embodiment of the present invention.

FIG. 2 is a front view illustrating a centrifugal brake structure in accordance with a preferred embodiment of the present invention.

FIG. 3 is a side view of FIG. 2, illustrating a brake structure assembled to a spool.

FIG. 4 is an exploded perspective view illustrating an assembling structure of the present invention.

FIG. 5 is a front view illustrating a brake body in accordance with the present invention.

FIG. 6 is a cross-sectional view of FIG. 5, taken along a line H—H.

FIG. 7 is a front view of a brake stopper in accordance with the present invention.

FIG. 7a is a plan view of FIG. 7.

FIG. 8 is a front view of a fixing plate in accordance with the present invention.

FIG. 9 is a cross-sectional view of FIG. 8, taken along a line F—F.

FIG. 10 is an enlarged cross-sectional view of FIG. 3, taken along a line K—K, illustrating a brake structure in braking state.

FIG. 11 is an enlarged cross-sectional view of FIG. 3, taken along a line K—K, illustrating a brake structure in braking release state.

FIG. 12 is a cross-sectional view of a brake structure in accordance with another embodiment of the present invention.

DETAILED DESCRIPTION OF THE PREFERRED EMBODIMENT

Now referring to FIG. 10, which depicts an assembled state of a brake structure of the present invention, since a spring 8 is inserted between a stopping protrusion 7b of the brake stopper 7 and a step portion 4e of the recess 4b, a brake stopper 7 that is inserted into a recess 4b of a brake body 4 is biased toward a spool shaft 10 by a spring force. Thus, the brake stopper is not operated by spring force when a low centrifugal force is applied to a fishing reel.

Brakes 6, each inserted into a pin 5, have a stopping step 6a for engaging with the brake stopper. In the drawing, one stopping step is positioned inside of fixing protrusion 9a of a fixing plate 9 and the other is positioned outside of the fixing protrusion. The stopping step is so flexible as to be passed over the fixing protrusion by pushing out the brake. In that case, since the stopping step of the brake cannot pass over the fixing protrusion by itself even though a centrifugal force is applied to, the brake is not operated. On the contrary, the other brake whose stopping step is positioned outside of the fixing protrusion, has a free braking function. However, referring to FIG. 11, since the stopping step of the brake is engaged with a protrusion wing 7a of the brake stopper 7, the brake is not operated when a spool is idlingly rotated or upon a short distance casting, so called a pitching or flip casting. That is, the brake stopper is pushed toward spool shaft by spring force and the stopping step of the the brake is engaged with the protrusion wing, so that the stopping step of the brake can not pass over the protrusion wing due to a low centrifugal force upon pitching or in flap casting. When a long distance casting which causes a large centrifugal force, the brake stopper passes over the protrusion wing of the brake stopper due to the large centrifugal force, so that the brake can be moved radially to be in contact with an inside of a brake ring. As mentioned above, since the fixing protrusion 9a is formed onto the fixing plate 9, and the brake engages with the fixing protrusion, the number of operating brake is controllable.

In the state of FIG. 11, when a long distance casting, the spool 3 is rotated rapidly and a brake assembly assembled onto the spool shaft 10 is rotated at same speed as that of the spool. In that case, large centrifugal force that is superior to the spring force is applied so that the brake stopper 7 is pushed out toward the brake ring. Thus, the stopping step 6a of the brake 6 which is engaged with the protrusion wing 7a of the brake stopper 7 before large centrifugal force is applied, is pushed out (toward brake ring) with the brake stopper moving toward the brake ring due to large centrifugal force. The brake, thus being in contact with the inside of the brake ring, so that a rotating spool is controlled by a friction force between brake and brake ring.

When the casting fishing line with a sinker suspended thereto, drops in speed during casting, the rotating speed of spool drops as well, lowering the centrifugal force. In that case, the brake stopper 7 is moved back toward the spool shaft 10 by spring force of the spring 8. Then, the stopping step 6a is also pushed toward the spool shaft 10 by the inwardly moving protrusion wing 7a of the brake stopper 7, so that the brake is separated from the inside of the brake ring, and the spool is rotated without any interference. Therefore, the casting fishing line is cast so long a distance without reduction of casting distance.

Meanwhile, as mentioned before, the number of operating brake is controllable in accordance with changing of a fishing manner and a personal preference thereof. If, it is intended to use all of the brakes, pulling all of the brakes outwardly by finger should be necessary such that the stopping step 6a of the brake 6 may pass over the fixing protrusion 9a of the fixing plate 9. In that case, it is controllable of an outwardly moving distance of the brake stopper according to centrifugal force level such that the friction force between brake and brake ring is controllable with the force level as well, allowing the operational force of a brake controlled precisely. Therefore, the fishing man is able to adopt a delicate fishing technique using the present invention.

FIG. 12 is a cross-sectional view of a brake structure according to another embodiment of the present invention. A protruding step 7s is formed onto the middle portion of the brake stopper 7. When the fishing line is cast a long distance, that is, only large centrifugal force is applied to, the protruding step 7s also being in contact with the inside of the brake ring, thus to obtain a larger friction force.

The number of brake stopper is controllable, more than one brake stopper being preferable.

While the present invention has been described and illustrated herein with reference to the preferred embodiments thereof, it will be understood by those skilled in the art that various changes in form and details may be made therein without departing from the spirit and scope of the present invention.

What is claimed is:

1. A centrifugal brake structure of a dual bearing type fishing reel, comprising:

a brake body assembled onto a spool shaft and having a plurality of pins and a plurality of circumferential recesses, each recess having a stepped portion;

a fixing plate for fixing or releasing an operation of the brake, the fixing plate connected to the brake body and having fixing protrusions;

a plurality of brakes inserted onto the plurality of pins of the brake body for braking a rotation of the spool shaft;

a plurality of brake stoppers each having a stopping protrusion, each brake stopper inserted into one of the recesses of the brake body, the plurality of brake stoppers enabling the plurality of brakes to be pushed out along the plurality of pins only when casting a long distance; and a plurality of springs, one spring assembled between each stopping protrusion and each step portion of the recesses, wherein the brakes operate to brake the spool shaft only when casting a long distance, and not when the spool shaft is idlingly rotated or cast only a short distance.

2. The brake structure according to claim 1, wherein the brake stopper comprises a protruding step formed onto a middle portion of the brake stopper, the protruding step being in contact with the inside of a brake ring for obtaining a larger frictional force therebetween while casting a long distance.

* * * * *